United States Patent [19]

Wada et al.

[11] Patent Number: 5,211,069
[45] Date of Patent: May 18, 1993

[54] STEERING DEVICE

[75] Inventors: Shunichi Wada; Minoru Kawabata, both of Nara, Japan

[73] Assignee: Koyo Seiko Co., Ltd., Osaka, Japan

[21] Appl. No.: 861,019

[22] Filed: Mar. 31, 1992

[30] Foreign Application Priority Data

Apr. 19, 1991 [JP] Japan .............................. 3-036082[U]

[51] Int. Cl.5 ...................... F16H 55/28; F16H 35/08; B62D 5/22
[52] U.S. Cl. ..................................... 74/400; 74/89.17; 74/498; 74/499; 91/375 A
[58] Field of Search .............. 74/400, 498, 499, 89.17, 74/422; 91/375 A

[56] References Cited

U.S. PATENT DOCUMENTS

| 2,605,854 | 8/1952 | MacDuff | 74/400 X |
| 3,060,762 | 10/1962 | Lutz | 74/499 |
| 3,170,338 | 2/1965 | Ivanchich | 74/499 |

FOREIGN PATENT DOCUMENTS 61-302 8/1986 Japan .

Primary Examiner—Allan D. Herrmann
Attorney, Agent, or Firm—Mason, Fenwick & Lawrence

[57] ABSTRACT

The meshing between a rack which moves according to steering operation and a sector gear meshed with the rack is adjusted by the movement of an output shaft in its own axis direction which is united with the sector gear. A through hole is formed along the axis center line of the output shaft, and a threaded shaft is inserted into the through hole. The threaded shaft is screwed into the output shaft. One end of the threaded shaft is accessible for rotating from the side where a steering mechanism member is mounted. The other end of the threaded shaft is connected to a housing in a manner that the threaded shaft is rotatable around in its own axis but that the threaded shaft is unmovable in its own axis direction.

10 Claims, 3 Drawing Sheets

"prior art"

STEERING DEVICE

FIELD OF THE INVENTION

The present invention relates to a steering device which transmits steering instructions input to a steering road wheels through meshing between a rack and a sector gear.

DESCRIPTION OF THE RELATED ART

A ball-screw power steering device 101 disclosed in Japanese Examined Publication Utility Model 61-302 shown in FIG. 3 comprises a housing 102, a ball screw 109 rotatable according to steering operation, a ball nut 103 meshed with the ball screw 109 through balls, a rack 104 which is shaped on the ball nut 103, a sector gear 105 meshed with the rack 104, and an output shaft 106 which is united with the sector gear 105. A pitman arm 110 is fitted to the lower end of the output shaft 106. The pitman arm 110 is connected to steering road wheels through a link (omitted from the figure). As an additional steering force in support of an steering action, hydraulic pressure according to the steering direction acts on the ball nut 103. When the ball screw 109 rotates according to the steering operation, the rack 104 along with the ball nut 103 moves, causing the output shaft 106 to rotate. The rotation of the output shaft 106 is transferred to the steering road wheels through the pitman arm 110, consequently causing a vehicle to steer.

In the above-mentioned steering device 101, each time teeth of the rack 104 and the sector gear 105 wear out or when the rack 104 and the sector gear 105 are assembled, the meshing between the rack 104 and the sector gear 105 needs adjusting. Since the teeth of the rack 104 and the teeth of the sector gear 105 are inclined with respect to each other, the positional relationship between the rack 104 and the sector gear 105 should be adjusted for proper setting of backlash by moving the output shaft 106 in its own axis direction. In order to allow for this adjustment, the output shaft 106 is held by the housing 102 in a manner that the output shaft 106 is movable in its own axis direction. Such a movement of the shaft 106 allows the rack 104 to be properly meshed with the sector gear 105.

Specifically, a threaded shaft 107 is screwed into the upper portion of the housing 102. The lower portion of the threaded shaft 107 is connected to the upper portion of the output shaft 106 in a manner that the threaded shaft 107 is relatively rotatable around its own axis with respect to the output shaft 106 but that the threaded shaft 107 is relatively unmovable in its own axis direction with respect to the output shaft 106. The threaded shaft 107 has, on its top portion, an indentation 108 intended for use with a tool, so that the threaded shaft 107 can be rotated from upward. The rotation of the threaded shaft 107 thus causes the output shaft 106 to move in its own axis direction, with respect to the housing 102. Along with the output shaft 106, the sector gear 105 also moves with respect to the housing 102, consequently adjusting the meshing between the sector gear 105 and the rack 104.

SUMMARY OF THE INVENTION

The conventional steering device 101, in which the threaded shaft 107 is projected out of the housing 102, has a disadvantages as follows. When some other components are mounted on top of the steering device 101, mutual interference may take place between the threaded shaft 107 and other components. Also, when some other components are mounted above top of the steering device 101, the other components prevent the threaded shaft 107 to rotate from upward.

Mounting the threaded shaft 107 on the lower portion of the output shaft 106 may be considered to overcome such difficulties. Since a steering mechanism member such as a pitman arm 110 has to be mounted on the lower portion of the output shaft 106, the lower portion of the output shaft 106 needs to be exposed out of the housing. Therefore, such a conventional construction as a threaded shaft screwed into a housing cannot permit to mount the threaded shaft on the lower portion of the output shaft.

It is an object of the present invention to provide a steering device which overcomes the above-mentioned difficulties.

The steering device according to the present invention comprises a housing, a rack movable according to steering operation, a sector gear meshed with the rack, an output shaft which is united with the sector gear, and a steering mechanism member which is mounted on one end of the output shaft, wherein the movement of the output shaft in its own axis direction with respect to the housing adjusts the meshing between the rack and the sector gear, a through hole is formed along the axis center line of the output shaft, a threaded shaft is inserted into the through hole, the threaded shaft is screwed into the output shaft, one end of the threaded shaft is accessible to rotate from a side where the steering mechanism member is mounted, and the other end of the threaded shaft is connected to the housing in a manner that the threaded shaft is rotatable around its own axis but that the threaded shaft is unmovable in its own axis direction.

According to the steering device of the present invention, the output shaft is moved in its own axis direction, with respect to the housing, by rotating the threaded shaft from the side where the steering mechanism member is mounted. The resulting movement of the output shaft in its own axis direction relative to the housing adjusts the meshing between the rack and the sector gear.

The above construction eliminates mutual interference between the threaded shaft and other components which are mounted on top of the steering device. The above construction also avoids, in rotating the threaded shaft, the physical difficulty presented by other components which are mounted on top of the steering device. Specifically, to adjust the meshing between the rack and the sector gear by moving the output shaft in its own axis direction, the threaded shaft can be rotated for the adjustment from the side where the steering mechanism member is mounted. Thus, the mutual interference between the threaded shaft and other components is eliminated, and easy operation of rotating the threaded shaft is assured.

In a preferred arrangement for connecting the other end of the threaded shaft to the housing, a head portion is formed on the other end of the threaded shaft, a retaining ring is fitted inside the housing, a ring is supported by the retaining ring, the threaded shaft is inserted through both the retaining ring and the ring, and the head portion of the threaded shaft is positioned between the housing and the ring. This arrangement allows the other end of the threaded shaft to be connected easily to the housing. Preferably, the housing is cast, and a steel member is provided between the head portion of the threaded shaft and the housing. The use of the cast housing lowers the material costs. Furthermore, the steel member provided between the head portion of the threaded shaft and the cast housing avoids wear of the cast housing by rubbing against the head portion of the threaded shaft. This wear resistant structure prevents the slack of the threaded shaft in its own axis direction from increasing, and the meshing between the rack and the sector gear is accurately adjusted.

Preferably, one end of the threaded shaft is exposed out of the output shaft, and the exposed portion of the threaded shaft has a locknut screwed onto it, wherein the locknut is pressed against the surface of the end of the output shaft in a manner the locknut keeps the threaded shaft locked not to rotate. According to this arrangement, the meshing between the rack and the sector gear once properly adjusted is prevented from getting slack later.

Preferably, a bushing is provided between the external circumferential surface of the threaded shaft and the inner circumferential wall of the through hole. The bushing prevents the threaded shaft from inclining to the output shaft, and thus a smooth rotation of the threaded shaft is assured when adjusting the meshing between the rack and the sector gear.

DETAILED DESCRIPTION OF THE PREFERRED EMBODIMENT

Figure 1:
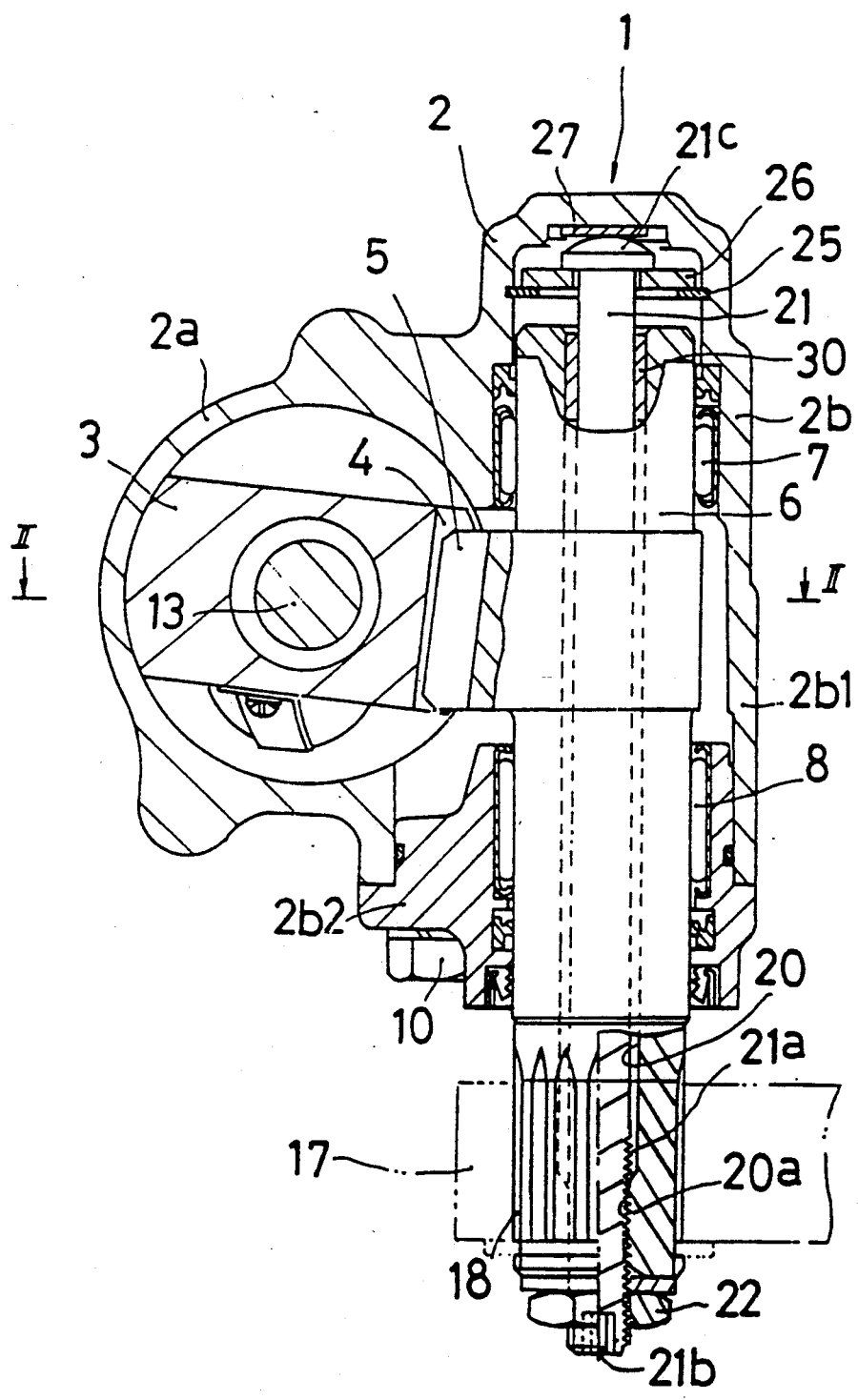
FIG. 1 is a cross-sectional view showing a ball-screw power steering device according to an embodiment of the present invention.
Figure 2:
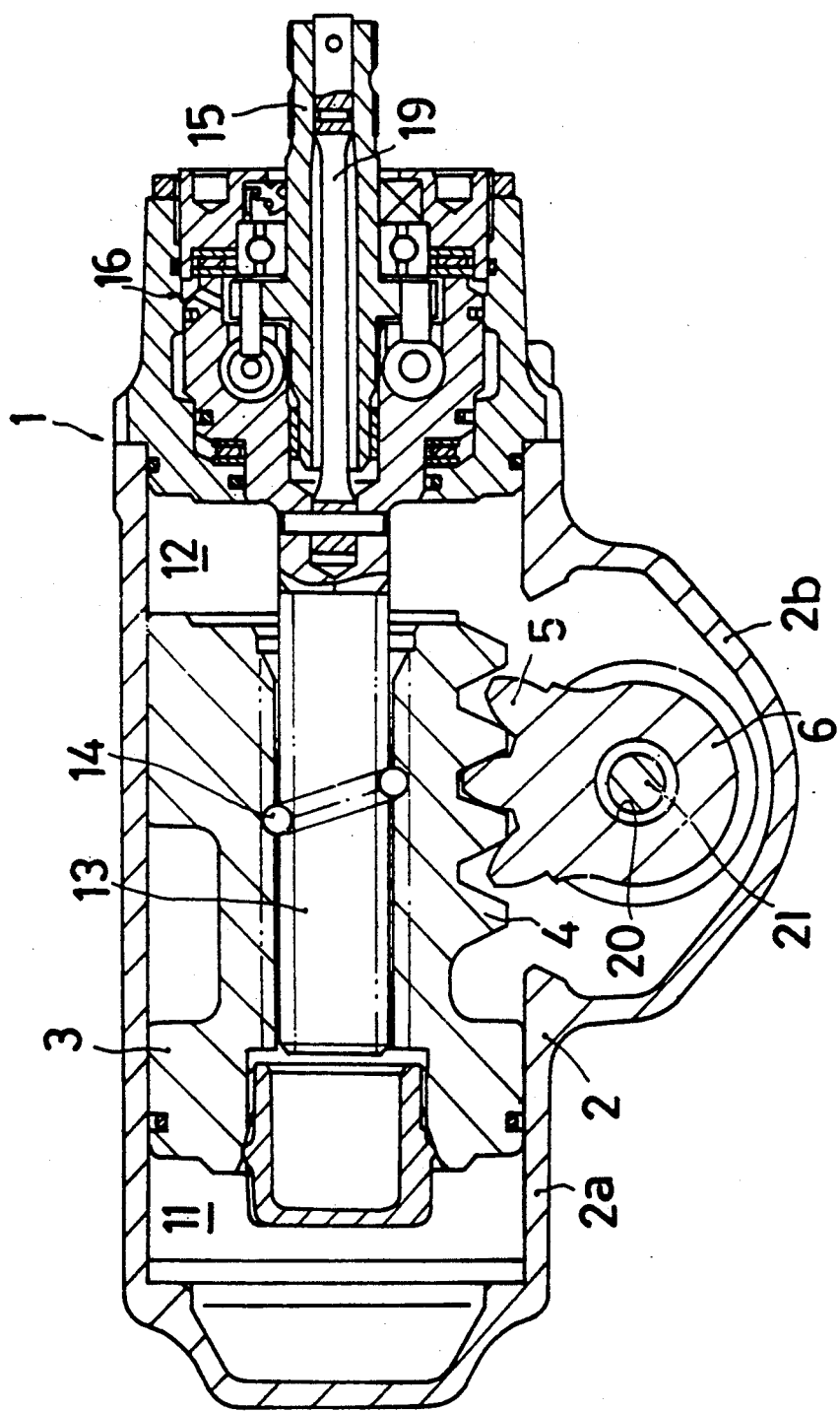
FIG. 2 is a cross-sectional view taken along II—II in FIG. 1.
Figure 3:
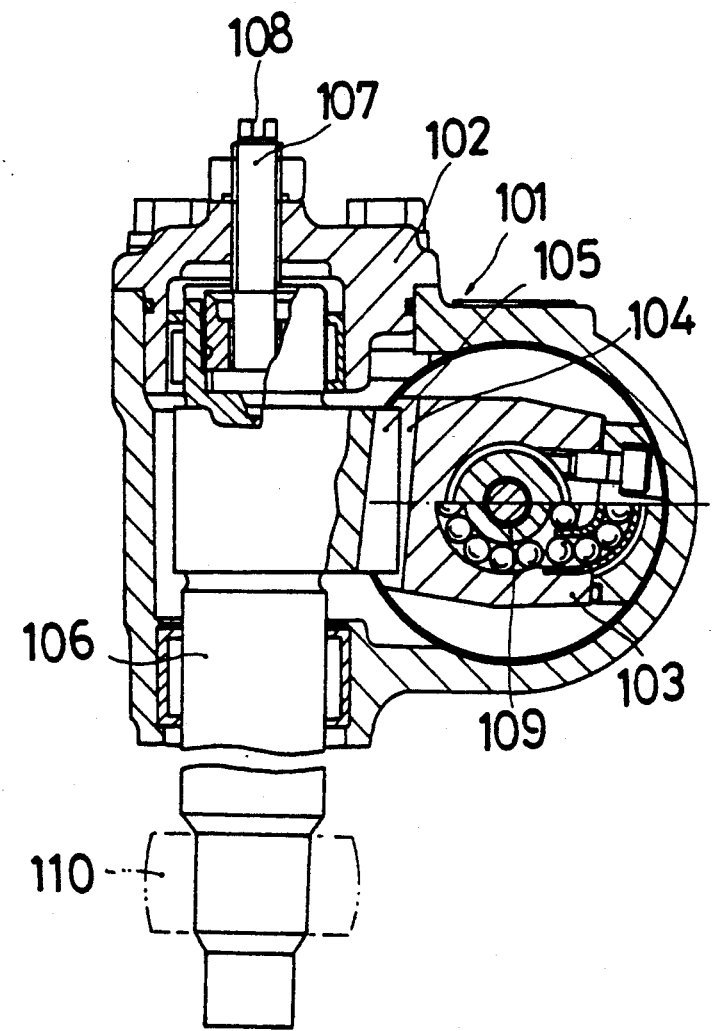
FIG. 3 is a cross-sectional view showing a conventional ball-screw power steering device.

Illustrated in both FIG. 1 and FIG. 2 is a ball-screw power steering device which comprises a housing 2, a ball screw 13, a ball nut 3 meshed with the ball screw 13 through balls 14, a rack 4 which is shaped on the ball nut 3, a sector gear 5 meshed with the rack 4, an output shaft 6 which is united with the sector gear 5, and a pitman arm 17 (a steering mechanism member) fitted to the lower portion of the output shaft 6 through serration 18. The teeth of the rack 4 and the teeth of the sector gear 5 are inclined with respect to each other.

The housing 2, made of cast iron, comprises a first housing 2a, into which the ball nut 3 is inserted in a manner that the ball nut 3 is movable in its own axis direction, and a second housing 2b, in which the output shaft 6 is supported by means of a bearings 7 and 8 in a manner that the output shaft 6 is rotatable around its own axis and movable in its own axis direction. The second housing 2b comprises two members of upper and lower members, 2b1 and 2b2, both of which are connected by a bolt 10. The upper member 2b1 is cast with the first housing 2a.

Formed inside the first housing 2a are oil chambers 11 and 12, both of which are separated by the ball nut 3. An input shaft 15, connected to a steering wheel (omitted from the figure), is connected to the ball screw 13 through a torsion bar spring 19. A rotary valve 16 is disposed around the external circumference of the input shaft 15.

When the input shaft 15 is rotated according to steering operation, the rotational movement is transferred to the ball screw 13 via the torsion bar spring 19, and thus the ball nut 3 moves in its own axis direction. The movement of the ball nut 3 is then transferred to the output shaft 6 via the rack 4 and the sector gear 5, causing the output shaft 6 to rotate. The rotation of the output shaft 6 causes on the pitman arm 17 a swing motion, which is then transferred to steering road wheels via a link (omitted from the figure), thereby causing a vehicle to steer.

The rotary valve 16 may a known one (for example, the one disclosed in Japanese Examined Publication Utility Model 61-302). In such a rotary valve, pressurized oil provided by a pump (omitted from the figure) is circulated to one of two oil chambers 11 and 12 according to the steering direction, and then drained from the other of two oil chambers 11 and 12 into an oil tank (omitted from the figure). The above hydraulic pressure acts on the ball nut 3 to move it in its own axis direction, adding an extra steering force in support of the steering action.

The movement of the output shaft 6 in its own axis direction makes it possible to adjust the meshing between the rack 4 and the sector gear 5. To be more precise, a through hole 20 is formed along the axis center line of the output shaft 6. A threaded shaft 21 is inserted into through hole 20; the threaded shaft 21 has, on its outer circumference, an externally threaded portion 21a, which is screwed into an internally threaded portion 20a formed on the inner wall of the through hole 20. The lower portion of the threaded shaft 21 is projected out of the lower end of the output shaft 6. The threaded shaft 21 has, on its lower end, an indentation 21b intended for use with a tool such as a hexagon wrench. This allows the threaded shaft 21 to be rotated from the side where the pitman arm 17 is mounted. A locknut 22 is screwed onto the lower portion of the threaded shaft 21.

The upper end of the threaded shaft 21 is connected to the second housing 2b in a manner that the threaded shaft 21 is rotatable around its own axis but that the threaded shaft 21 is unmovable in its own axis direction. To be more precise, a retaining ring 25 is fitted in the upper inside portion of the second housing 2b, and a ring 26 is supported by the retaining ring 25. The threaded shaft 21 is inserted through the retaining ring 25 and the ring 26, and the head portion 21c of the threaded shaft 21 is positioned between the second housing 2b and the ring 26. The head portion 21c of the threaded shaft 21 is in contact with the upper surface of the ring 26. A steel plate 27 is provided between the head portion 21c of the threaded shaft 21 and the second housing 2b. The head portion 21c of the threaded shaft 21 is in contact with the steel plate 27 in a manner which allows the threaded shaft 21 to be rotatable on its own axis. A small clearance may be allowed between the head portion 21c and the ring 26, as long as the clearance does not affect the adjustment of meshing between the rack 4 and the sector gear 5, and as long as the movement of the threaded shaft 21 in its own axis direction is substantially constrained against the housing 2. A bushing 30, provided between the external circumferential surface of the threaded shaft 21 and the inner circumferential wall of the through hole 20, prevents the threaded shaft 21 from inclining to the output shaft 6.

In the construction mentioned above, the threaded shaft 21, screwed into the output shaft 6, is connected to the housing 2 in a manner that the threaded shaft 21 is rotatable around its own axis but that the threaded shaft 21 is unmovable in its own axis direction, and thus the rotation of the threaded shaft 21 causes the output shaft 6 to move in its own axis direction. This movement of the output shaft 6 works to modify the backlash between the rack 4 and the sector gear 5, thereby allowing the meshing between the rack 4 and the sector gear 5 to be adjusted. In such a construction, the threaded shaft 21 is accessible to rotate from downward, i.e., from the side where the pitman arm 17 is mounted; thus, no interference problem takes place between the threaded shaft 21 and other components mounted on top of the housing 2. Furthermore, other components mounted on top of the housing 2 present no physical difficulty in the operation of rotating the threaded shaft 21.

The threaded shaft 21 is connected to the housing 2, by inserting the threaded shaft 21 through both the ring 26 and the retaining ring 25, and then by fitting the retaining ring 25 along with the threaded shaft 21 and the ring 26 into the housing 2. The connecting operation is thus easy to make.

The use of the cast housing 2 lowers the material costs.

Furthermore, since the steel plate 27 is provided between the head portion 21c of the threaded shaft 21 and the cast housing 2, the cast housing 2 is prevented from wear by rubbing against the head portion 21c of the threaded shaft 21. This wear resistant structure prevents the slack of the threaded shaft 21 in its own axis direction from increasing, and the meshing between the rack 4 and the sector gear 5 is accurately adjusted.

After the adjustment of meshing between the rack 4 and the sector gear 5, the locknut 22 is screwed onto the threaded shaft 21 to lock it, in a manner that the locknut 22 is pressed against the surface of the end of the output shaft 6 so that the threaded shaft 21 is no longer rotatable. According to this arrangement, the meshing between the rack 4 and the sector gear 5 once properly adjusted is prevented from getting slack.

The bushing 30 prevents the threaded shaft 21 from inclining to the axis of the output shaft 6, thus a smooth rotation of the threaded shaft 21 is assured when adjusting the meshing between the rack 4 and the sector gear 5.

The present invention is not limited to the above-mentioned embodiment. For example, in the foregoing disclosure the present invention is applied to a power steering device, the present invention may be applied to other type of device such as a manual steering device.

What is claimed is:

1. A steering device comprising:
a housing, a rack movable according to steering operation, a sector gear meshed with the rack, an output shaft which is united with the sector gear, and a steering mechanism member which is mounted on one end of the output shaft, wherein the movement of the output shaft in its own axis direction with respect to the housing adjusts the meshing between the rack and the sector gear, a through hole is formed along the axis center line of the output shaft, a threaded shaft is inserted into the through hole, the threaded shaft is screwed into the output shaft, one end of the threaded shaft is accessible to rotate from a side where the steering mechanism member is mounted, and the other end of the threaded shaft is connected to the housing in a manner that the threaded shaft is rotatable around its own axis but that the threaded shaft is unmovable in its own axis direction.

2. A steering device according to claim 1, wherein said other end of the threaded shaft is formed as a head portion, a retaining ring is fitted inside the housing, a ring is supported by the retaining ring, the threaded shaft is inserted through both the retaining ring and the ring, and the head portion of the threaded shaft is positioned between the housing and the ring allowing said other end of the threaded shaft to be connected to the housing.

3. A steering device according to claim 2, wherein the housing is cast, and a steel member is provided between the head portion of the threaded shaft and the housing.

4. A steering device according to claim 1, wherein one end of the threaded shaft is exposed out of the output shaft, a locknut is screwed onto the exposed portion of the threaded shaft, and the locknut is pressed against the surface of the end of the output shaft, locking the threaded shaft and preventing the rotation thereof.

5. A steering device according to claim 4, wherein a bushing is provided between the external circumferential surface of the threaded shaft and the inner circumferential wall of the through hole.

6. A steering device according to claim 2, wherein one end of the threaded shaft is exposed out of the output shaft, a locknut is screwed onto the exposed portion of the threaded shaft, and the locknut is pressed against the surface of the end of the output shaft, locking the threaded shaft and preventing the rotation thereof.

7. A steering device according to claim 3, wherein one end of the threaded shaft is exposed out of the output shaft, a locknut is screwed onto the exposed portion of the threaded shaft, and the locknut is pressed against the surface of the end of the output shaft, locking the threaded shaft and preventing the rotation thereof.

8. A steering device according to claim 1, wherein a bushing is provided between the external circumferential surface of the threaded shaft and the inner circumferential wall of the through hole.

9. A steering device according to claim 2, wherein a bushing is provided between the external circumferential surface of the threaded shaft and the inner circumferential wall of the through hole.

10. A steering device according to claim 3, wherein a bushing is provided between the external circumferential surface of the threaded shaft and the inner circumferential wall of the through hole.

* * * * *